US011334571B2

(12) United States Patent
Kudryavtsev et al.

(10) Patent No.: US 11,334,571 B2
(45) Date of Patent: May 17, 2022

(54) ARTIFICIAL INTELLIGENCE-ENABLED SEARCH FOR A STORAGE SYSTEM

(71) Applicant: Marvell World Trade Ltd., St. Michael (BB)

(72) Inventors: Konstantin Kudryavtsev, Sunnyvale, CA (US); Mats Oberg, San Jose, CA (US); Nedeljko Varnica, San Jose, CA (US)

(73) Assignee: MARVELL ASIA PTE, LTD., Singapore (SG)

( * ) Notice: Subject to any disclaimer, the term of this patent is extended or adjusted under 35 U.S.C. 154(b) by 7 days.

(21) Appl. No.: 16/518,564

(22) Filed: Jul. 22, 2019

(65) Prior Publication Data

US 2020/0042528 A1 Feb. 6, 2020

Related U.S. Application Data

(60) Provisional application No. 62/712,828, filed on Jul. 31, 2018.

(51) Int. Cl.
*G06F 16/24* (2019.01)
*G06F 16/2457* (2019.01)
(Continued)

(52) U.S. Cl.
CPC .... *G06F 16/24575* (2019.01); *G06F 16/2272* (2019.01); *G06F 16/284* (2019.01); *G06N 20/00* (2019.01)

(58) Field of Classification Search
CPC .................................................. G06F 16/24575
(Continued)

(56) References Cited

U.S. PATENT DOCUMENTS

2009/0037351 A1* 2/2009 Kristal .................. G06Q 10/04
706/12
2010/0049431 A1* 2/2010 Zetune ..................... G06K 9/00
701/532
(Continued)

FOREIGN PATENT DOCUMENTS

EP 3113042 1/2017
EP 3113042 A1 * 1/2017 ......... G06F 16/9024

OTHER PUBLICATIONS

"Extended European Search Report", European Application No. 19189250.4, dated Nov. 20, 2019, 10 pages.
(Continued)

*Primary Examiner* — Syling Yen

(57) ABSTRACT

The present disclosure describes apparatuses and methods for artificial intelligence-enabled search of a storage system. In some aspects, a metadata manager of a storage system receives a label of an object that an AI engine detects in data stored in the storage system. The metadata manager creates, in a relational section of a metadata database, an entry for the detected object with an identifier of the label of the detected object and an address of a node corresponding to the detected object. The metadata manager also creates, in a navigational portion of the metadata database and with the address of the detected object, the node that includes a reference to a relative node of another object and a weight of a relationship between the node and the relative node. By so doing, the metadata database may be searched based on weighted relationships between various nodes, thereby enabling contextual or implicit search of data in the storage system.

20 Claims, 10 Drawing Sheets

(51) Int. Cl.
*G06N 20/00* (2019.01)
*G06F 16/28* (2019.01)
*G06F 16/22* (2019.01)

(58) Field of Classification Search
USPC ........................................................ 707/791
See application file for complete search history.

(56) References Cited

U.S. PATENT DOCUMENTS

2013/0218898 A1*  8/2013  Raghavan ........... G06F 16/2433
                                                707/741
2014/0280108 A1   9/2014  Dunn et al.
2019/0340492 A1* 11/2019  Burger ..................... G06N 3/08
2020/0320100 A1* 10/2020  Piecko ................. G06F 16/284

OTHER PUBLICATIONS

"Foreign Office Action", EP Application No. 19189250.4, dated Oct. 4, 2021, 12 pages.
"Notice of Allowance", U.S. Appl. No. 16/518,564, filed Jan. 10, 2022, 6 pages.

\* cited by examiner

Relational Database 204

Log Table 302

| Object 308 | Label ID 310 | Label Type 312 | Address Reference to Graph 314 | Confidence 316 |
|---|---|---|---|---|
| 1 | 40C71115-FA8D-40FC-92E1-0E9A3E92F23F | Object | 209866 | 15% |
| 2 | E7A24B94-7CFC-479D-A26E-5DD56BB1480 | Scene | 201000 | 80% |
| ... | | | | |
| N | 87A9D43E-228F-3C1A-0556-9F113074B221 | Person | 157009 | 37% |

Address Table 304

| Address 326 | File Path 328 | Offset 330 | ... |
|---|---|---|---|
| 157008 | /var/www/html/image.jpg | 0 | |
| 157009 | /home/user/video/file.mp4 | 354 | |
| ... | ... | ... | |

Node Information Table 306

| Address of Related Object 332 | Relationship Weight 334 |
|---|---|
| 167052 | 0.78 |
| 153001 | 0.31 |
| 163112 | 0.96 |
| ... | ... |

ARTIFICIAL INTELLIGENCE-ENABLED SEARCH FOR A STORAGE SYSTEM

CROSS REFERENCE TO RELATED APPLICATION

This present disclosure claims priority to U.S. Provisional Patent Application Ser. No. 62/712,828 filed Jul. 31, 2018, the disclosure of which is incorporated by reference herein in its entirety.

BACKGROUND

Businesses and institutions often implement enterprise-level data systems to collect and house vast amounts of data generated from ongoing operations, research, data mining, or other data sources. To accommodate the ever-increasing volume, variety, and velocity of data collected from these sources, enterprise-level data systems are built with ever-increasing storage capacity to house the endless flow of incoming data. The sources of the incoming data, however, are typically a combination of controlled sources and uncontrolled sources. This results in most data systems storing a complex mixture of big data that includes structured data, unstructured data, and semi-structured data.

While data system administrators are often able to scale storage capacity with the larger volumes of big data, analysis of or search for specific data items within the big data often becomes more difficult or inefficient as the amount of unstructured data increases. In particular, the big data typically includes vast amounts of unstructured or raw data that does not comply with standard naming, formatting, or description conventions that are leveraged by typical search algorithms. For example, a typical search algorithm may compare a key word of a search to file names and text within the files for an explicit or exact match to the key word. Thus, a search of this type may fail to return results for much of the big data that includes relevant unstructured data items missed by a strict matching algorithm. As such, use of typical matching algorithm can be inefficient and inaccurate as these types of search algorithms often miss relevant data, particularly in unstructured or semi-structured data.

SUMMARY

This summary is provided to introduce subject matter that is further described in the Detailed Description and Drawings. Accordingly, this Summary should not be considered to describe essential features nor used to limit the scope of the claimed subject matter.

In some aspects, a metadata manager of a storage system implements a method that receives, from an artificial intelligence (AI) engine, a label for an object detected in data stored in the storage media of the storage system. The metadata manager creates an entry for the detected object in a relational section of a metadata database of the storage system. The entry in the relational section includes an identifier of the label and an address of a node corresponding to the detected object in a navigational section of the metadata database. The metadata manager also creates, with the address, the node corresponding to the detected object in the navigational section of the metadata database. This node includes at least one reference to a relative node in the navigational section that corresponds to another object in the data to which the detected object is related and a weight of a relationship between the node and the relative node. By so doing, the metadata database may be searched based on the weighted relationships of these and other nodes, which may enable contextual or implicit search of the data stored to the storage system.

In other aspects, an apparatus comprises an interface to receive data from a host, storage media configured to store the data received from the host, a controller configured to enable access to the data stored on the storage media, and a metadata manager associated with an AI engine. The metadata manager may be implemented to receive, from the AI engine, a label for an object detected by the AI engine in the data stored to the storage media of the apparatus. The metadata manager then creates an entry for the detected object in a relational database of a metadata database of the apparatus. The entry in the relational database includes an identifier of the label and an address of a node corresponding to the detected object in a navigational database of the metadata database. The metadata manager also creates the node corresponding to the detected object at the address in the navigational database of the metadata database. The node includes at least one reference to a relative node in the navigational database that corresponds to another object in the data to which the detected object is related contextually and a weight of a relationship between the node and the relative node in the navigational database.

In yet other aspects, a System-on-Chip (SoC) is described that includes an interface to storage media of a storage system, an interface to a host from which data is received for writing to the storage media, a hardware-based processor, and a memory storing processor-executable instructions that, responsive to execution by the hardware-based processor, implement a metadata manager. The metadata manager receives, from an AI engine, a label for an object detected by the AI engine in the data written to the storage media. The metadata manager then creates an entry for the detected object in a relational database of a metadata database. The entry for the detected object includes an identifier of the label and an address of a node corresponding to the detected object in a navigational database of the metadata database. The metadata manager also creates the node corresponding to the detected object with the address in the navigational database of the metadata database. The node in the navigational database includes at least one reference to a relative node in the navigational database that corresponds to another object in the data to which the detected object is related contextually and a weight of a relationship between the node and the relative node in the navigational database.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of a storage system with AI-enabled search are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Figure 1:
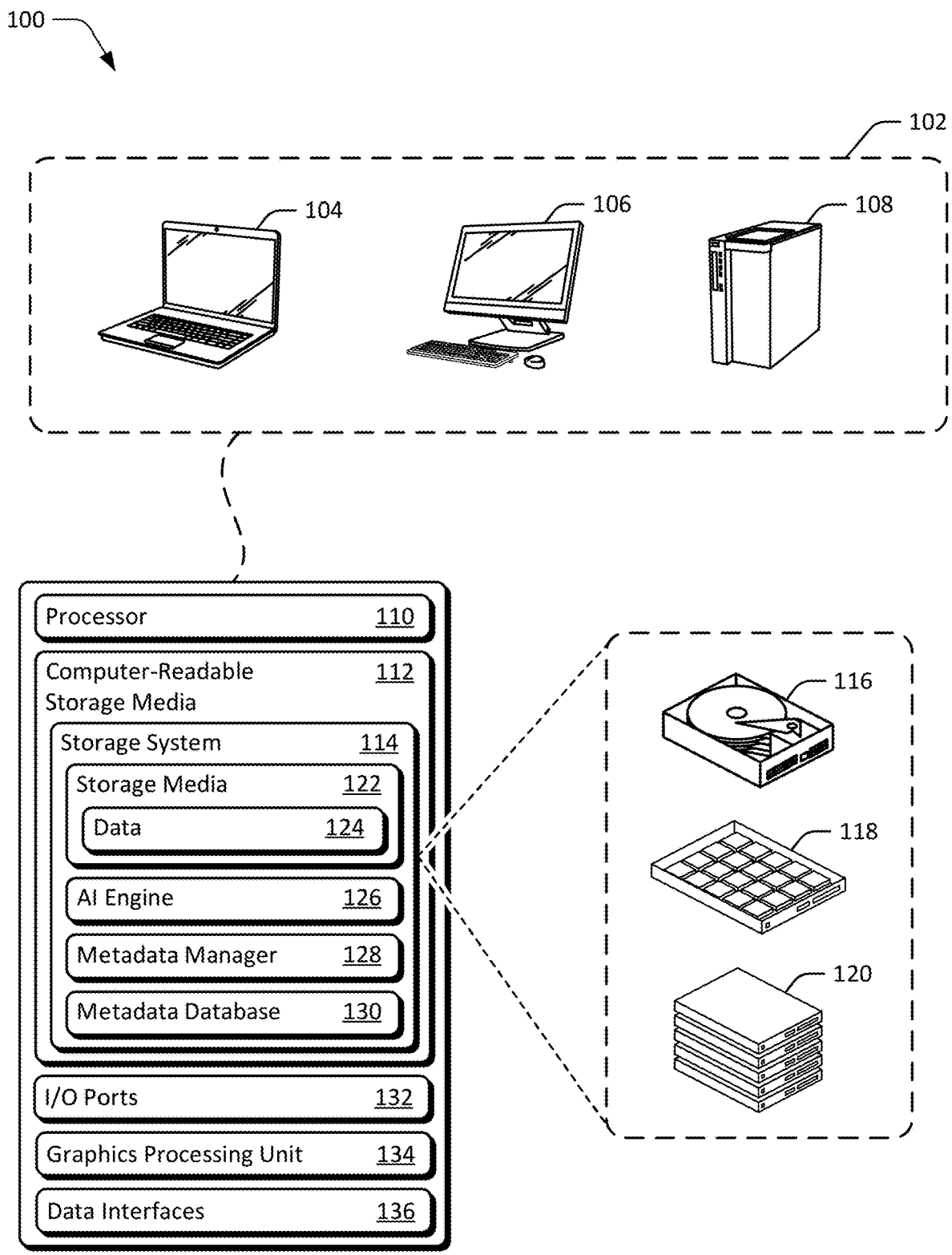
FIG. 1 illustrates an example operating environment having devices in which a storage system is implemented in accordance with one or more aspects.

Conventional techniques for searching through data often rely on finding an exact match for a search term in names and text of stored data. Generally, data is stored to various types of electronic storage in discrete files, the format and sizes of which differ depending on an application that produces the data. Most operating systems support a semantic search of the data files by key word whereby the search algorithm looks through the data files based on name or text in the data. Specifically, a semantic search algorithm may go through a list of files, open each file, read text content for comparison to the key word, close the file, and then report any matches of file name or text content with the key word. This type of search is typically limited due to the binary nature of the data in which key words may have a same meaning but are semantically different.

Additionally, in the case of big data storage, such as in cloud-based or enterprise-level applications, the big data may include vast amounts of unstructured or raw data that does not comply with standard naming, formatting, or description conventions leveraged by these conventional search algorithms. Thus, a strictly semantic search may fail to return accurate results for big data that includes relevant unstructured data items that are missed by the search algorithm due to a lack of semantically matching text. As such, the use of conventional search algorithms, particularly with big data, is often inefficient or inaccurate because these search algorithms can miss relevant data due to a lack of exact or explicit semantic matching.

This disclosure describes apparatuses and techniques for AI-enabled search for a storage system. In contrast with conventional search techniques, the described apparatuses and techniques may implement an AI-enabled search of data in a storage system based on context or relationships of objects in the data. For example, an AI engine may process the data to generate descriptive metadata labels for objects or other elements detected in the data. Along with the labels, the AI engine may also provide a confidence level of object detection, as well as a confidence level (e.g., weight) of a contextual relationship or association among the objects in the data. For example, certain objects or people detected in same or adjacent frames on a video file may have some weighted relationship due to physical or temporal proximity. Similarly, text generated from the soundtrack or dialogue of the video (e.g., lyrics or close captioning) and the objects detected at a same time in a media file may have the relationship as well. Alternately or additionally, sentiment or emotion can be detected in audio files from voice tone, and these scene classifications may have some weighted relationship with content or objects associated with the audio files.

Based on the labels, a metadata manager of the storage system may create and manage a metadata database that includes a relational database (e.g., tables) and a navigational database (e.g., a weighted graph of nodes). Generally, the metadata manager creates entries in the relational database for each detected object that includes a location of the detected object in the storage system and an address of a corresponding node in the navigational database. The metadata manager also creates the node in the navigational database, such as in the weighted graph that includes weighted links to other nodes that correspond to respective objects in the data to which the detected object is related. By placing the nodes, or metadata objects, into the weighted graph, not only may a certain object be found in such a structure, but also aspects of the object's environment and related objects with defined confidence levels (e.g., for contextual relationships). Returning to the above example, a topic of an audio file may be found in combination with its sentiment, ambiance, mood, atmosphere, or the like.

This type of contextual search may be based on a logical or semantic request, but may progress with blurred boundaries, returning a response that includes some uncertain portions or components. In the context of AI-enabled search, the relational database of tables may provide a starting point for the logical request (e.g., label lookup or matching), while the navigational database enables contextual or relationship-based search with some level of uncertainty. For example, the navigational database may be implemented through a tree or graph of mapped relations with context-weighted connections that may be navigated through various instructions, such as "next", "previous", "getChild", "getParent", and so on to find contextually related objects. As such, various implementations of AI-enabled search for a storage system may include a combination of a relational database and a navigational database to enable implicit or contextual search of stored data.

By way of example, when a user runs a search for a key word, the metadata manager or a search agent may first run through an indexed log table of the relational database to obtain label identifiers for objects or elements detected in the data stored in the AI-enabled storage system. In the indexed log table, a reference to a node in a weighted graph of the navigational database may be found, which points to the node and therefore all connected nodes of related objects. The node and connected nodes may be reported in an order of link weights between the nodes, providing an indication of context or relatedness of the objects in the data to which the nodes correspond. Generally, the search process enabled by the combination of relational and navigational databases may resemble the way the human brain works, when by one detail each aspect of a whole scene is remembered.

In various aspects of AI-enabled search for a storage system, a metadata manager receives, from an AI engine, a label for an object detected in data stored in storage media of the storage system. The metadata manager creates, in a relational section of a metadata database of the storage system, an entry for the detected object. The entry in the relational section includes an identifier of the label, an address of the detected object in the storage system, and an address of a node corresponding to the detected object in a navigational section of the metadata database.

The metadata manager also creates, with the address, the node corresponding to the detected object in the navigational section of the metadata database. This node includes at least one reference to a relative node in the navigational section that corresponds to another object in the data to which the detected object is related and a weight of a relationship between the node and the relative node in the navigational section of the metadata database. By so doing, the metadata database may be searched based on the weighted relationships of these and other nodes, which may enable contextual or implicit search of data stored in the storage system. In other words, by implementing AI-enabled search for a storage system or storage drive (e.g., edge storage), the storage can be made "smart" to provide users with implicit or contextual search results.

The following discussion describes an operating environment, techniques that may be employed in the operating environment, and a System-on-Chip (SoC) in which components of the operating environment can be embodied. In the context of the present disclosure, reference is made to the operating environment by way of example only.

Operating Environment

FIG. 1 illustrates an example operating environment 100 having a computing device 102, capable of storing or accessing various forms of data or information. Examples of a computing device 102 may include a laptop computer 104, desktop computer 106, and server 108, any of which may be configured as part of a storage network or cloud storage. Further examples of computing device 102 (not shown) may include a tablet computer, a set-top-box, a data storage appliance, wearable smart-device, television, content-streaming device, high-definition multimedia interface (HDMI) media stick, smart appliance, home automation controller, smart thermostat, Internet-of-Things (IoT) device, mobile-internet device (MID), a network-attached-storage (NAS) drive, aggregate storage system, gaming console, automotive entertainment device, automotive computing system, automotive control module (e.g., engine or power train control module), and so on. Generally, the computing device 102 may communicate or store data for any suitable purpose, such as to enable functionalities of a particular type of device, provide a user interface, enable network access, implement gaming applications, playback media, provide navigation, edit content, provide data storage, or the like.

The computing device 102 includes a processor 110 and computer-readable storage media 112. The processor 110 may be implemented as any suitable type or number of processors, either single-core or multi-core, for executing instructions or commands of an operating system or other programs of the computing device 102. The computer-readable media 112 (CRM 112) includes memory (not shown) and a storage system 114. The memory of the computing device 102 may include any suitable type or combination of volatile memory or nonvolatile memory. For example, the volatile memory of computing device 102 may include various types of random-access memory (RAM), dynamic RAM (DRAM), static RAM (SRAM) or the like. The non-volatile memory may include read-only memory (ROM), electronically erasable programmable ROM (EEPROM) or Flash memory (e.g., NOR Flash or NAND Flash). These memories, individually or in combination, may store data associated with applications and/or an operating system of computing device 102.

The storage system 114 of the computing device 102 may be configured as any suitable type of data storage system, such as a storage device, storage drive, storage array, storage volume, or the like. Although described with reference to the computing device 102, the storage system 114 may also be implemented separately as a standalone device or as part of a larger storage collective, such as a data center, server farm, or virtualized storage system (e.g., for cloud-based storage or services). Examples of the storage system 114 include a hard disk drive 116 (HDD 116), a solid-state drive 118 (SSD 118), and a storage array 120, which may be implemented with any combination of storage devices or storage drives.

The storage system 114 includes storage media 122 on which data 124 of the computing device 102 or other sources is stored. The storage media 122 may be implemented with any type or combination of storage media, such as magnetic media, optical media, a spinning disk, non-volatile memory, solid-state media, or the like. In some cases, the data 124 may be organized into files of data (e.g., content) or data objects that are stored in the storage media 122 of the storage system 114. The types, sizes, or formats of the files may vary depending on a respective source, use, or application associated with the file. For example, the files stored to the storage media 122 may include audio files, video files, text files, image files, multimedia files, spreadsheets, and so on.

Generally, a file of data may include various objects, activities, or features, which may be categorized or recognized as one of a person, text, music, lyric, content, sentiment, ambiance, theme, setting, or the like. Each object, activity, or feature in the data of a file may also be contextually related within the file, by a varying degree or weight of relationship with another object. For example, a frame or frame sequence of a multimedia file may include people, objects, dialogue, music, or ambiance which may be contextually related due to common presence, physical proximity, or temporal proximity in the multimedia file. Alternately or additionally, the data 124 can include big data, such as structured data, unstructured data, or semi-structured data from a variety of controlled or uncontrolled sources. In some cases, the unstructured data or semi-structured data includes non-descriptive file names or text that are not useful to discern objects in the data (e.g., generic or machine-generated) or unrelated to content (e.g., object or elements) of the data. In such cases, the AI-enabled search described herein may create labels for the various objects in the big data, thereby enabling useful search and analysis of the big data stored on the storage system 114.

In this example, the storage system 114 also includes an instance of an artificial intelligence engine 126 (AI engine 126), a metadata manager 128, and a metadata database 130. The AI engine 126 may implement one or more AI models to process the data 124 to detect objects or elements in the data, data files, or data objects stored on the storage system 114. Based on the detection of the objects or elements, the AI engine 126 generates descriptive metadata labels for the objects or elements detected in the data. Along with the labels, the AI engine 126 may also provide a confidence level of object detection, as well as a confidence level (e.g., weight) of a contextual relationship or association among the objects in the data. For example, certain objects or people detected in same or adjacent frames on a video file may have some weighted relationship due to physical or temporal proximity.

With the labels provided by the AI engine 126, the metadata manager 128 may create or manage the metadata database 130 of the storage system 114 that includes a relational database (e.g., tables, not shown) and a navigational database (e.g., a weighted graph of nodes, not shown). In some aspects, the metadata manager 128 creates entries in the relational database for each detected object where the entries may include a location of the detected object in the storage system and an address to a corresponding node in the navigational database. The metadata manager 128 may also create the node in the navigational database, such as in the weighted graph that includes weighted links to other nodes corresponding to respective objects in the data to which the detected object is related. By placing the nodes, or metadata objects, into the weighted graph, not only may a certain object be found in such a structure, but also aspects of the object's environment and related objects with defined confidence levels (e.g., for contextual relationships). How the AI engine 126, metadata manager 128, and metadata database 130 are implemented and used varies and is described throughout the disclosure.

The computing device 102 may also include I/O ports 132, a graphics processing unit 134 (GPU 134), and data interfaces 136. Generally, the I/O ports 132 allow a computing device 102 to interact with other devices, peripherals, or users. For example, the I/O ports 132 may include or be coupled with a universal serial bus, human interface devices, audio inputs, audio outputs, or the like. The GPU 134 processes and renders graphics-related data for computing device 102, such as user interface elements of an operating system, applications, or the like. In some cases, the GPU 134 accesses a portion of local memory to render graphics or includes dedicated memory for rendering graphics (e.g., video RAM) of the computing device 102.

The data interfaces 136 of the computing device 102 provide connectivity to one or more networks and other devices connected to those networks. The data interfaces 136 may include wired interfaces, such as Ethernet or fiber optic interfaces for communicated over a local network, intranet, or the Internet. Alternately or additionally, the data interfaces 136 may include wireless interfaces that facilitate communication over wireless networks, such as wireless LANs, wide-area wireless networks (e.g., cellular networks), and/or wireless personal-area-networks (WPANs). Any of the data communicated through the I/O ports 132 or the data interfaces 136 may be written to or read from the storage system 114 of the computing device 102 in accordance with one or more aspects of AI-enabled search for a storage system.

Figure 2:
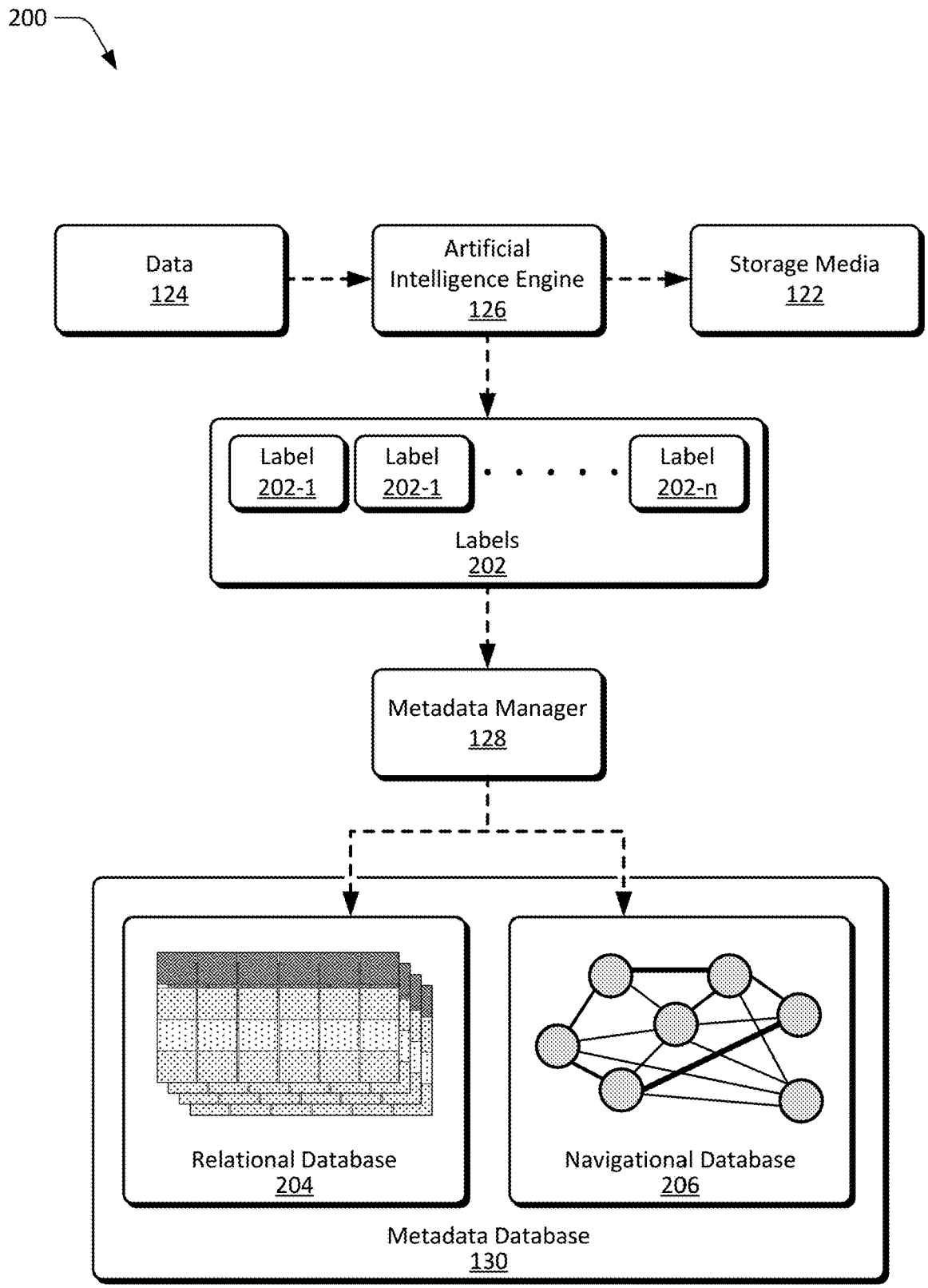
FIG. 2 illustrates example configurations of an artificial intelligence (AI) engine and a metadata manager of the storage system shown in FIG. 1.

FIG. 2 illustrates example configurations of an artificial intelligence engine 126 and metadata manager 128 generally at 200, which are implemented in accordance with one or more aspects of AI-enabled search for a storage system. In this example, the AI engine 126 is operably coupled with the storage media 122 and metadata manager 128 of the storage system 114. Although illustrated as being a component of the storage system 114, the AI engine 126 may be implemented separately from or external to the storage system 114. The AI engine 126 processes the data 124 that is written to or stored on the storage media 122 to detect, identify, or recognize various objects in the data 124.

Based on the processing or reprocessing of the data 124, the AI engine 126 generates descriptive metadata labels 202 (or tags) for objects or other elements detected in the data, such as activities or features described herein. In this example, the artificial engine 126 generates respective labels 202-1 through 202-n for up to n objects detected in the data 124. Along with the labels 202, the AI engine 126 may also provide a confidence level of object detection, as well as a confidence level (e.g., weight) of a contextual relationship of the object with another object or group of objects in the data 124. For example, certain objects or people detected in same or adjacent frames on a video file may have some weighted relationship due to physical or temporal proximity in the data or video file. The AI engine 126 may provide, with or as part of the label 202, an indication of weight or strength of a contextual relationship between any two or more detected objects, such as people, activities, features, music, lyrics, text, ambiance, sentiment, mood, emotion, and so on.

With respect to processing performed by the AI engine 126, the AI engine 126 may be implemented with machine-learning that is based on one or more neural networks for object detection or determination of contextual relationship, such as relationship weight between detected objects or other metadata elements. Each AI model or neural network of the AI engine 126 may include a group of connected nodes, such as neurons or perceptrons, which are organized into one or more layers. By way of example, an AI model (e.g., machine-learning model) of the AI engine 126 may be implemented with a deep neural network that includes an input layer, an output layer, and one or more hidden intermediate layers positioned between the input layer and the output layers of the neural network. Each node of the deep neural network may in turn be fully connected or partially connected between the layers of the neural network.

In various aspects, an AI model of the AI engine 126 may be implemented as a recurrent neural network with connections between nodes forming a cycle to retain information from a previous portion of an input data sequence for a subsequent portion of the input data sequence. Alternately, an AI model may be implemented as a feed-forward neural network having connections between the nodes that do not form a cycle between input data sequences. In yet other cases, an AI model of the AI engine 126 may include a convolutional neural network (CNN) with multilayer perceptrons where each neuron in a given layer is connected with all neurons of an adjacent layer. In some aspects, the AI model based on a convolutional neural network may be applied to data files for complex pattern and imagery recognition. Alternately or additionally, the AI engine 126 may include or utilize various regression models, such as multiple linear regression models, a single linear regression model, logistical regression models, step-wise regression models, multi-variate adaptive regression models, locally estimated scatterplot models, or the like.

Returning to FIG. 2, the AI engine 126 provides the labels 202 for the data 124 to the metadata manager 128. Based on the labels 202, the metadata manager 128 creates, manages, or updates the metadata database 130 which in this example includes a relational database 204 (e.g., tables) and a navigational database 206 (e.g., a weighted graph of nodes). The metadata manager 128 may be configured to create, based on the labels 202 and associated confidence levels, entries in the relational database 204 for each detected object that includes a location of the detected object in the storage system and an address to a corresponding node in the navigational database 206. The metadata manager 128 may also create, based on the labels 202 and associated confidence levels, the node in the navigational database 206. In some cases, the navigational database 206 is a weighted graph that includes, for a given node of a detected object, weighted links to other nodes that correspond to respective objects in the data to which the detected object is related. By placing the nodes, or meta data objects, into the navigational database 206, not only can a certain object be found in such a structure, but also aspects of the object's environment and related objects with defined confidence levels (e.g., for contextual relationships).

Figure 3:
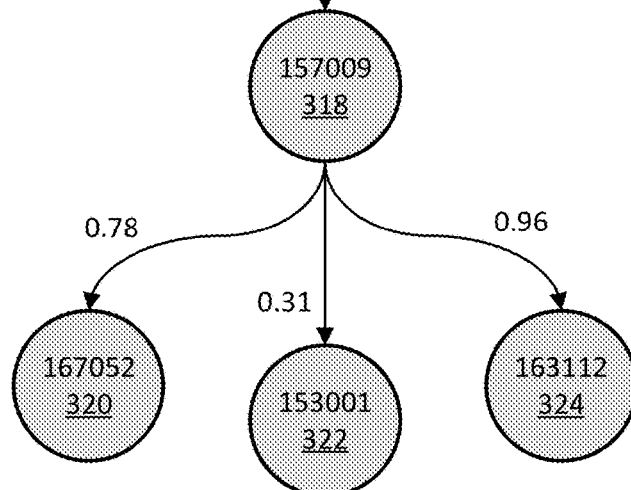
FIG. 3 illustrates example respective configurations of tables of a relational database in accordance with one or more aspects.

FIG. 3 illustrates an example configuration of the relational database 204 of FIG. 2 generally at 300. In aspects of AI-enabled search for storage systems, the relational database 204 may be implemented as one or more tables that include references to or identifiers for various properties or addresses of a detected object, such as a label identifier, an address to a corresponding node, a detection confidence level, a physical, logical, or virtual storage address, relative nodes, relationship weights, or the like. In this example, the relational database 204 includes a log table 302, an address table 304, and a node information table 306. In some aspects, records or labels 202 generated by the AI engine 126 are logged into the log table 302, such as for each instance of a detected object.

The log table 302 may include columns for an object identification 308, label identifier 310 (label ID 310), label type 312, address reference to graph 314, and confidence level 316. In some cases, the label ID 310 provides a searchable entry in the relational database 204 for a search agent or interface and the label type 312 indicates a type of the label generated for the detected object. The address reference to graph field 314 may provide a reference to a node 318 in the navigational database 206 that corresponds to the detected object and a reference to an address in the address table 304. The confidence level 316 may indicate a probability level of AI detection for the detected object. As shown in FIG. 3, the address reference to the graph 314 points to the node 318, which is related to node 320, node 322, and node 324 by varying respective relationship weights. The address reference to the graph 314 also points to an address ID field 326 of the address table 304, which indicates a file path 328 and offset 330 inside a file (e.g., frame offset in a multimedia file) of the detected object.

For each instance of a node, the relational database 204 may include a node information table 306. In some implementations, this table includes references or node addresses for related objects 332 of the node 318 (address 157009), as well as respective relationship weights 334 to the relative nodes. The metadata manager 128 may determine the relationship weights based on the labels 202 or from a confidence level of the contextual relationship of the objects in the data that is provided by the AI engine 126. Generally, the relationship weights 334 between the relative nodes may correspond to a weight or strength of a contextual relationship of detected objects in the data 124 which correspond to the nodes. In other words, navigating through relative nodes based on relationship weight 334 may provide an indication of how the detected objects relate in the data 124 of the storage system 114.

Figure 4:
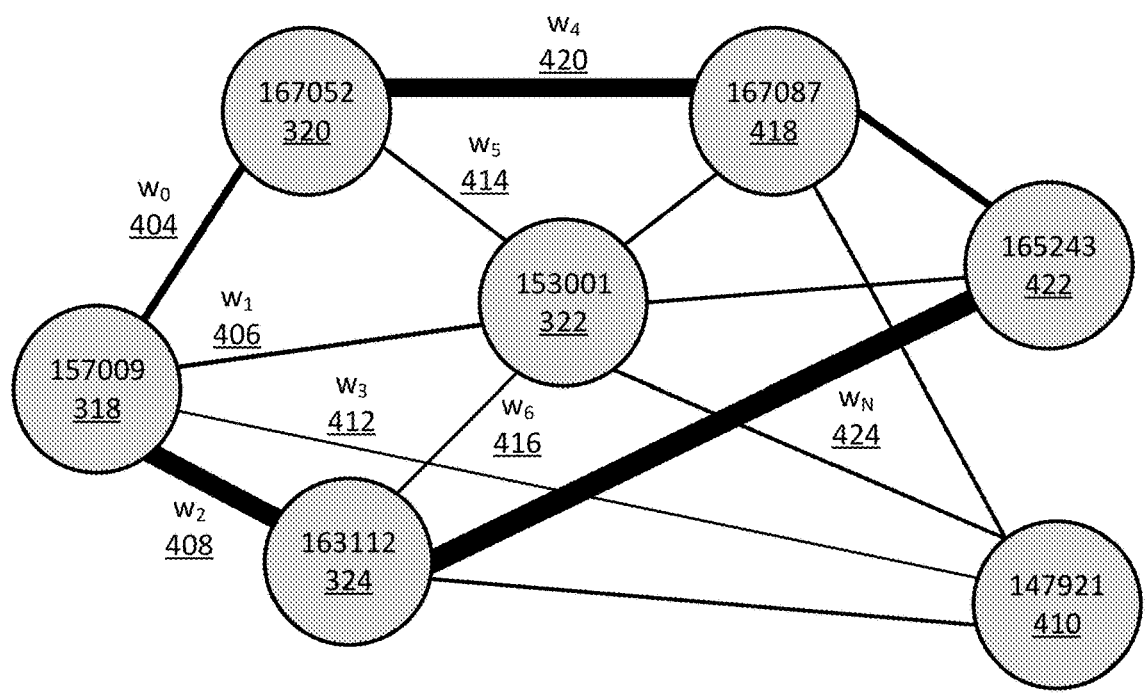
FIG. 4 illustrates an example configuration of a weighted graph of a navigational database in accordance with one or more aspects.

FIG. 4 illustrates an example configuration of the navigational database 206 of FIG. 2 generally at 400. In this example, the navigational database 206 includes a weighted graph 402 of linked nodes in which the links indicate a weight of relationships between relative nodes. Generally, the navigational database 206 can be implemented through a tree or graph of mapped relations with context-weighted connections that may be navigated through various instructions, such as "next", "previous", "getChild", "getParent", and so on to find contextually related objects. Here, the linked nodes of the weighted graph 402 may correspond to respective objects in the data 124 which are related through context, with the links representing a relationship between nodes and a weight or likelihood of the relationship.

Generally, the metadata manager 128 creates nodes in the weighted graph 402 based on the labels 202 and/or using information from the relational database 204. With reference to FIG. 3, the nodes 318 through 324 are shown with respective weighted links $w_0$ 404 through $w_2$ 408, which have a line weight indicative of the relationship weight between the relative nodes. The weight graph 402 also includes another relative node 410 of node 318 having a weighted link $w_3$ 412 that is weaker than the other weighted links as indicated by the lower weight. As the metadata manager 128 or a search agent navigates through the weighted graph 402, other contextually related objects may be found through additional weighted links. For example, the node 322 is also related through weighted link $w_5$ 414 to node 320 and through weighted link $w_6$ 416 to node 324. As part of a search, the AI-enabled search may also return results related to indirect connections, such as another node 418 that is not directly related to node 318 yet is closely related to node 320 through weighted link $w_4$ 420 or node 422 which is closely related to node 324 through weighted link $w_N$ 424. Accordingly, various implementations of AI-enabled search for a storage system may leverage a navigational database of weighted links to enable implicit or contextual search of stored data.

Techniques for AI-Enabled Search of a Storage System

The following discussion describes techniques of AI-enabled search for a storage system, which may enable implicit or contextual search of data stored on the storage system. These techniques may be implemented using any of the environments and entities described herein, such as the AI engine 126, metadata manager 128, or metadata database 130. These techniques include methods illustrated in FIGS. 5-8, each of which is shown as a set of operations performed by one or more entities.

These methods are not necessarily limited to the orders of operations shown in the associated figures. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, the methods may be combined to create an AI-processed metadata database with relational and navigational components that enable contextual or implicit searches of big data stored to a storage system. In portions of the following discussion, reference will be made to the operating environment 100 of FIG. 1 and entities of FIG. 2, FIG. 3, and/or FIG. 4 by way of example. Such reference is not to be taken as limiting described aspects to the operating environment 100, entities, or configurations, but rather as illustrative of one of a variety of examples. Alternately or additionally, operations of the methods may also be implemented by or with entities described with reference to the System-on-Chip of FIG. 9 and/or the storage system controller of FIG. 10.

Figure 5:
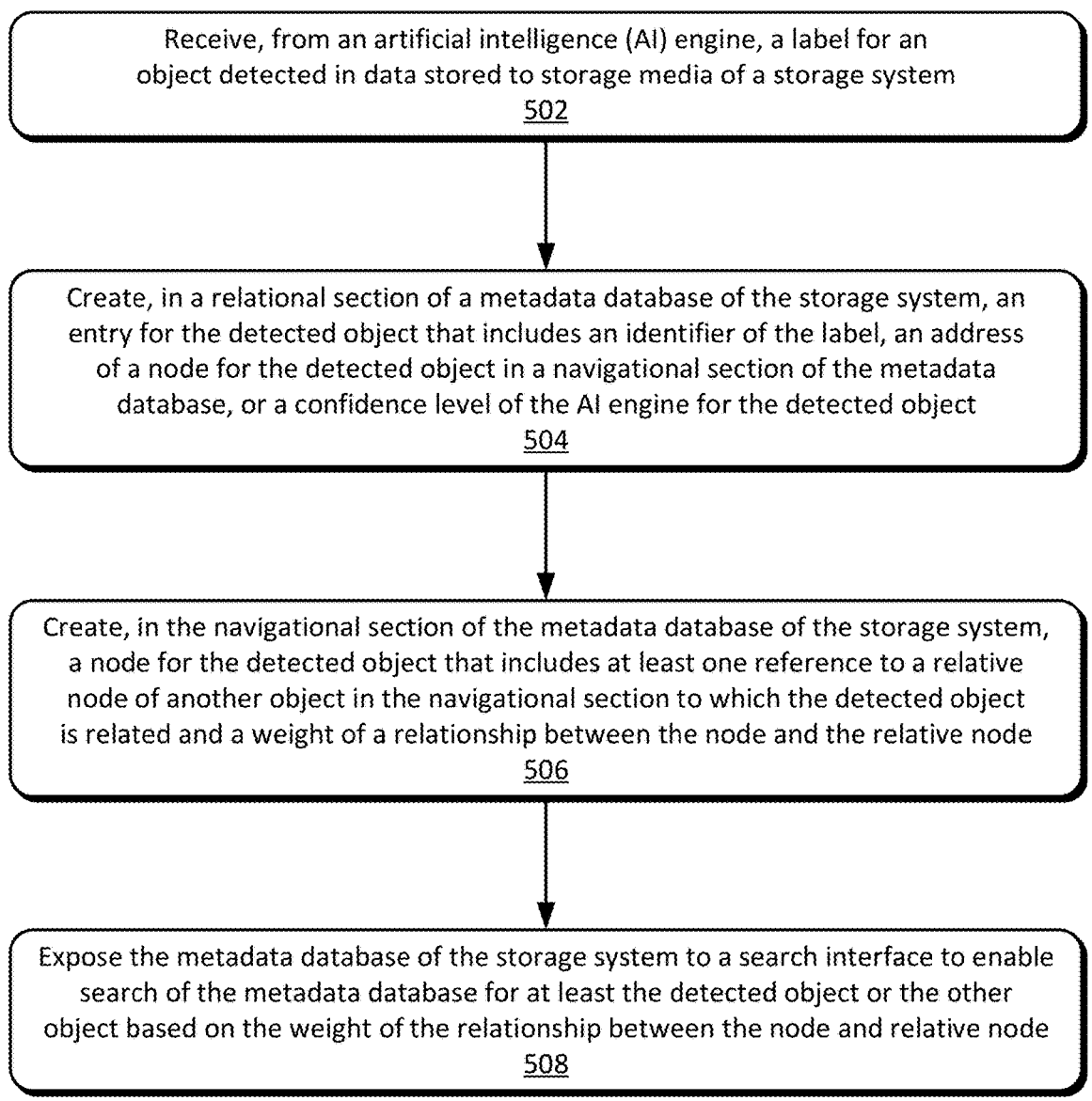
FIG. 5 depicts an example method for implementing AI-enabled search of data in a storage system in accordance with one or more aspects.

FIG. 5 depicts an example method 500 for implementing AI-enabled search of data in a storage system, including operations performed by or with the AI engine 126 or metadata manager 128 of the storage system.

At 502, the metadata manager of a storage system receives a label from the AI engine for an object detected by the AI engine in data stored in the storage system. In some cases, the AI engine detects the object while processing the data as the data is stored to storage media of the storage system. In other cases, the AI engine processes or reprocesses data stored on the storage media of the storage system.

At 504, the metadata manager creates an entry for the detected object in a relational section of a metadata database of the storage system. The relational section of the metadata database may be a relational database or multiple tables having related entries for metadata objects or labels. In some cases, the entry for the detected object includes the label, an identifier of the label, an address of a node that corresponds to the detected object, or a confidence level of the AI engine for the detected object.

At 506, the metadata manager creates a node for the detected object in a navigational section of the metadata database of the storage system. The navigational section of the metadata database may be a weighted graph of linked nodes, a tree structure of nodes, a network of linked nodes, or the like. In some cases, the node in the navigational section includes references to relative nodes that correspond to other objects in the data to which the detected object is related and respective weights of a relationship between the node and other nodes.

At 508, the metadata manager exposes the metadata database of the storage system to a search interface to enable search of the metadata database for the detected object or other objects based on the respective weights of the relationships between the nodes of the navigational section.

Figure 6:
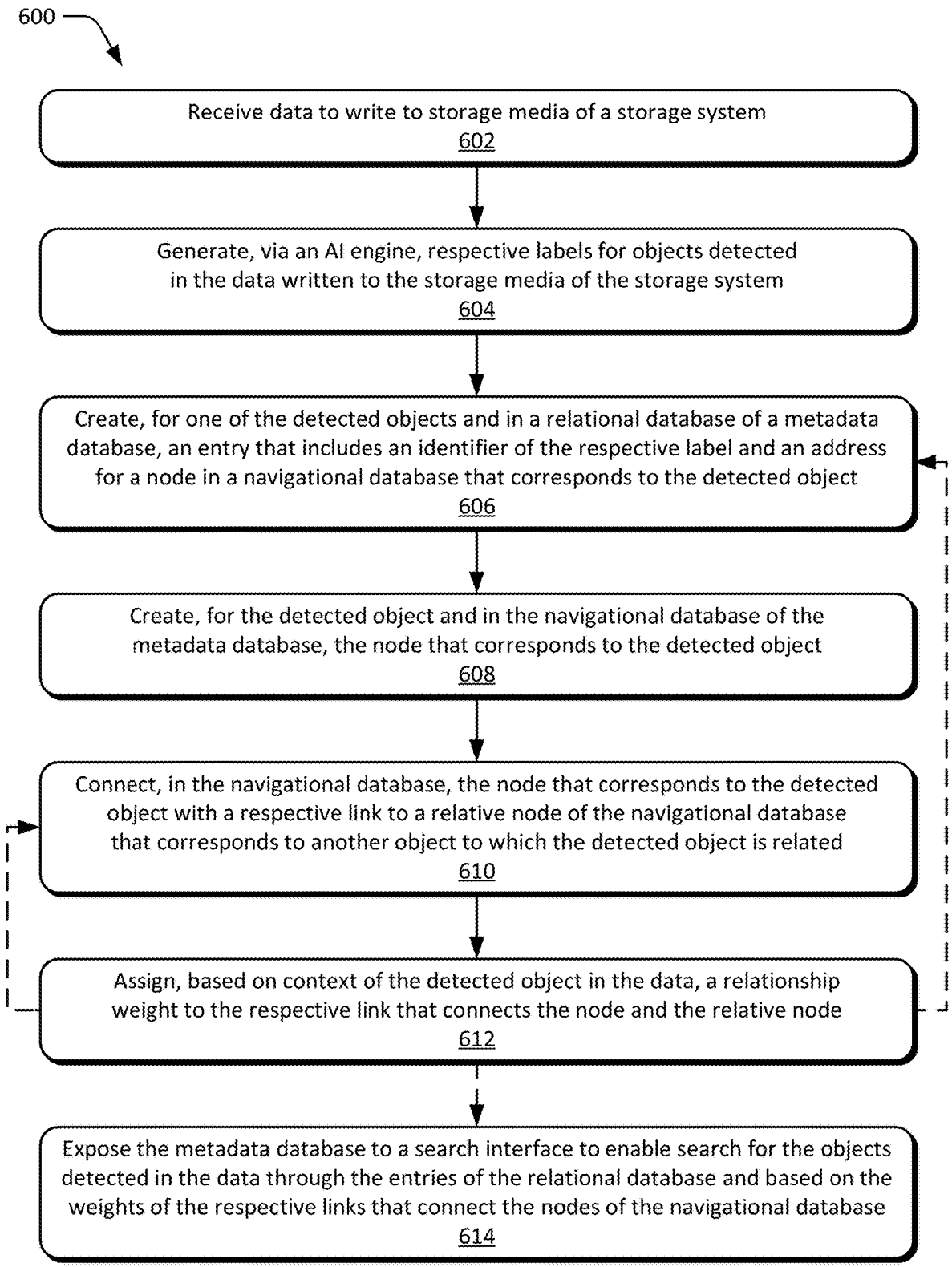
FIG. 6 depicts an example method for creating a relational database and metadata database of a metadata database for a storage system using labels provided by an AI engine.

FIG. 6 depicts an example method 600 for creating a relational database and metadata database of a metadata database for a storage system using labels provided by an AI engine. The operations of method 600 may be performed by or with the AI engine 126 or metadata manager 128 of the storage system.

At 602, a storage system receives data to write to storage media of the storage system. The data may be received from any suitable source, such as a computing device, network interface, storage fabric interface, or the like. The data may be organized into files of various type or size, depending on a source of the data.

At 604, the AI engine generates respective labels for objects detected in the data written to the storage media of the storage system. For example, an AI engine may process the data to generate descriptive metadata labels for objects or other elements detected in the data. Along with the labels, the AI engine may also provide a confidence level of object detection, as well as a confidence level (e.g., weight) of a contextual relationship or association among the objects in the data.

At 606, the metadata manager creates an entry for one of the detected objects in a relational database of a metadata database. The entry for the detected object may include an identifier of the respective label and an address for a node that corresponds to the detected object. Alternately or additionally, the entry may include a type of the label, a confidence level associated with detection of the object, or a confidence level or relationship weight for the object and another object detected in the data.

At 608, the metadata manager creates a node that corresponds to the detected object in the navigational database of the metadata database. In some cases, the node is created in a weighted graph that includes weighted links to other nodes that correspond to respective objects in the data to which the detected object is related.

At 610, the metadata manager connects, in the navigational database, the node that corresponds to the detected object with a respective link to a relative node of the navigational database. The relative node of the navigational database may correspond to another object in the data to which the detected object is related.

At 612, the metadata manager assigns, based on context of the detected object in the data, a relationship weight to the respective link that connects the node and the relative node. From operation 612, the method 600 may proceed to operation 614, return to operation 606 to create another node in the navigational database, or return to operation 610 to connect the node with another relative node.

At 614, the metadata manager exposes the metadata database to a search interface to enable search for the objects detected in the data. The search may be made through entries in the relational database to find relevant nodes in the navigational database. Alternately or additionally, the search may be based on the weights of respective links that connect the nodes of the navigational database. For example, a search agent may search through the entries of the relational database to find labels or label identifiers of objects of interest that were detected in data by the AI engine.

Figure 7:
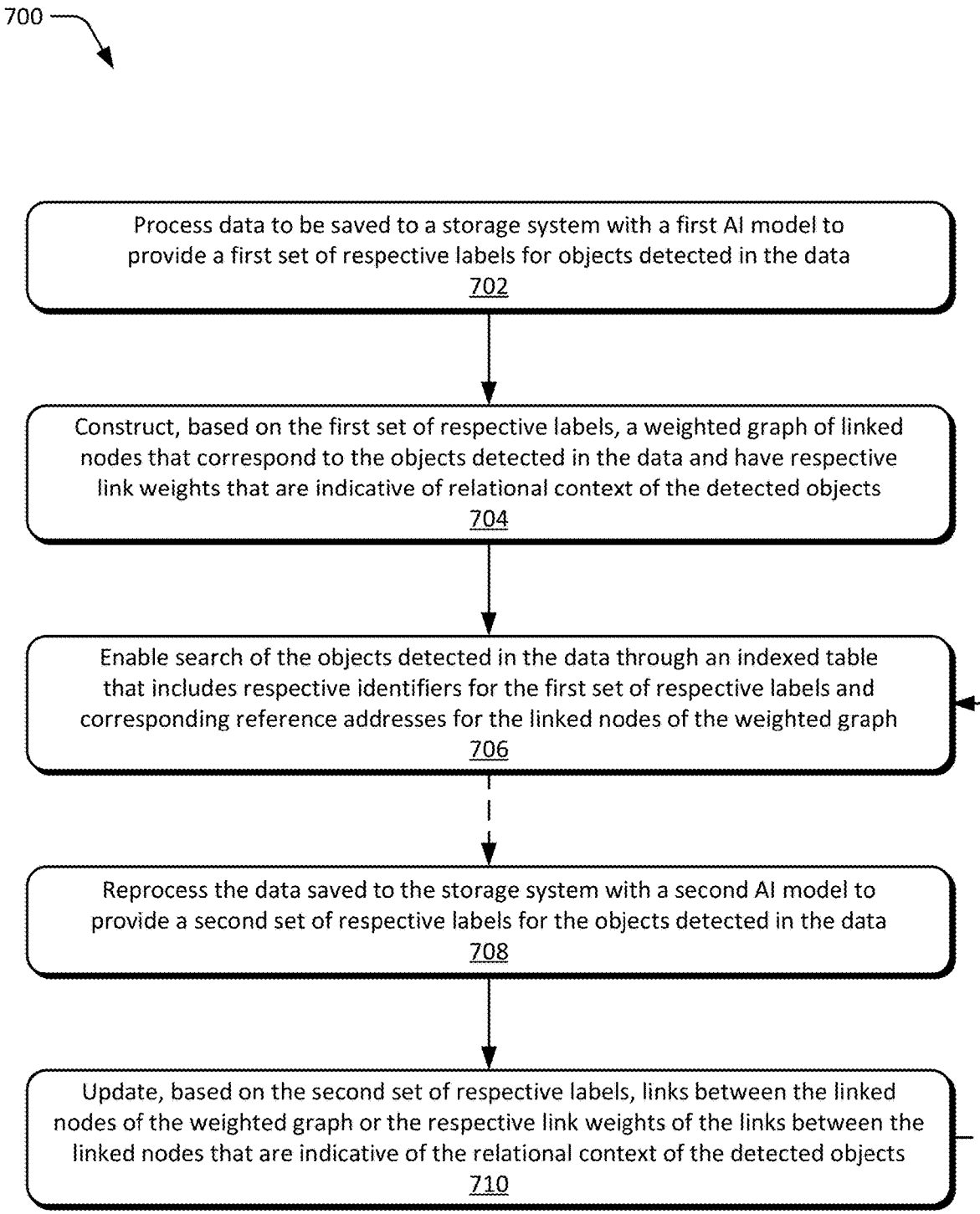
FIG. 7 depicts an example method for constructing or updating a weighted graph of a metadata database based on label sets provided by an AI engine processing data of a storage system.

FIG. 7 depicts an example method 700 for constructing or updating a weighted graph of a metadata database based on label sets provided by an AI engine processing data of a storage system. The operations of the method 700 may be performed by or with an AI engine 126 or metadata manager 128 of the storage system.

At 702, the AI engine processes data to be saved to a storage system with a first AI model to provide a first set of respective labels for objects detected in the data. At 704, the metadata manager constructs, based on the first set of respective labels, a weighted graph of linked nodes that correspond to the objects detected in the data. The linked nodes are connected by respective links each having a weight that is indicative of relational context of the detected objects.

At 706, the metadata manager enables search of the objects detected in the data through an indexed table that includes respective identifiers for the first set of respective labels and corresponding reference addresses for the linked nodes of the weighted graph. For example, a search agent may first run through the indexed log table of the relational database to find label identifiers for objects or elements detected in the data stored to the AI-enabled storage system. In the indexed log table, a reference to a node in a weighted graph of the navigational database may be followed to the node and therefore all connected nodes of related objects. The node and connected nodes may be reported in an order of link weights between the nodes, providing an indication of context or relatedness of the objects in the data to which the nodes correspond.

Optionally at 708, the AI engine reprocesses the data saved to the storage system with a second AI model to provide a second set of respective labels for the objects detected in the data. Generally, if the AI engine reprocesses the data with a second AI model, the weighted links or relationships of the nodes in the navigational database may be updated to emphasize or amplify other contextual relationships or to provide a different view of how the objects in the data may be related. Alternately or additionally, the AI engine may reprocess the data on the storage system when the storage system is idle or has excess processing bandwidth to support the reprocessing without affecting other storage system operations.

Optionally at 710, the metadata manager updates, based on the second set of respective labels, links between the linked nodes of the weighted graph or the respective link weights of the links between the linked nodes that are indicative of the relational context of the detected objects.

Figure 8:
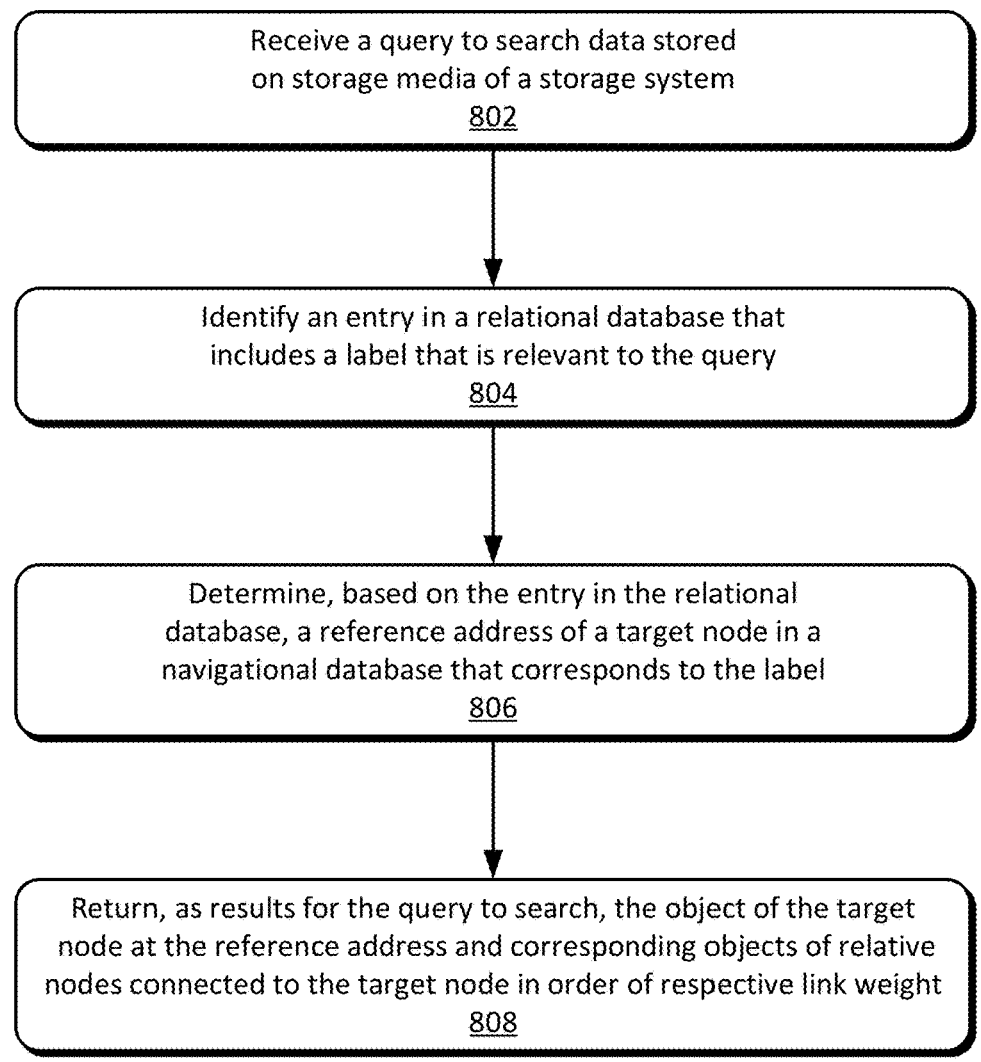
FIG. 8 depicts an example method of using a relational database and navigational database to search a storage system.

FIG. 8 depicts an example method 800 for using a relational database and navigational database to search a storage system, including operations performed by or with the metadata manager 128 of the storage system. Alternately or additionally, the operations may be performed with or by a search agent associated with the metadata manager or the storage system.

At 802, the metadata manager receives a query to search data stored on storage media of a storage system. The query may include one or more key words or search terms of the search. At 804, the metadata manager identifies an entry in a relational database that includes a label that is relevant to the query. In some cases, an address table of the relational database is used as a key or primary search list for objects in the storage system.

Figure 9:
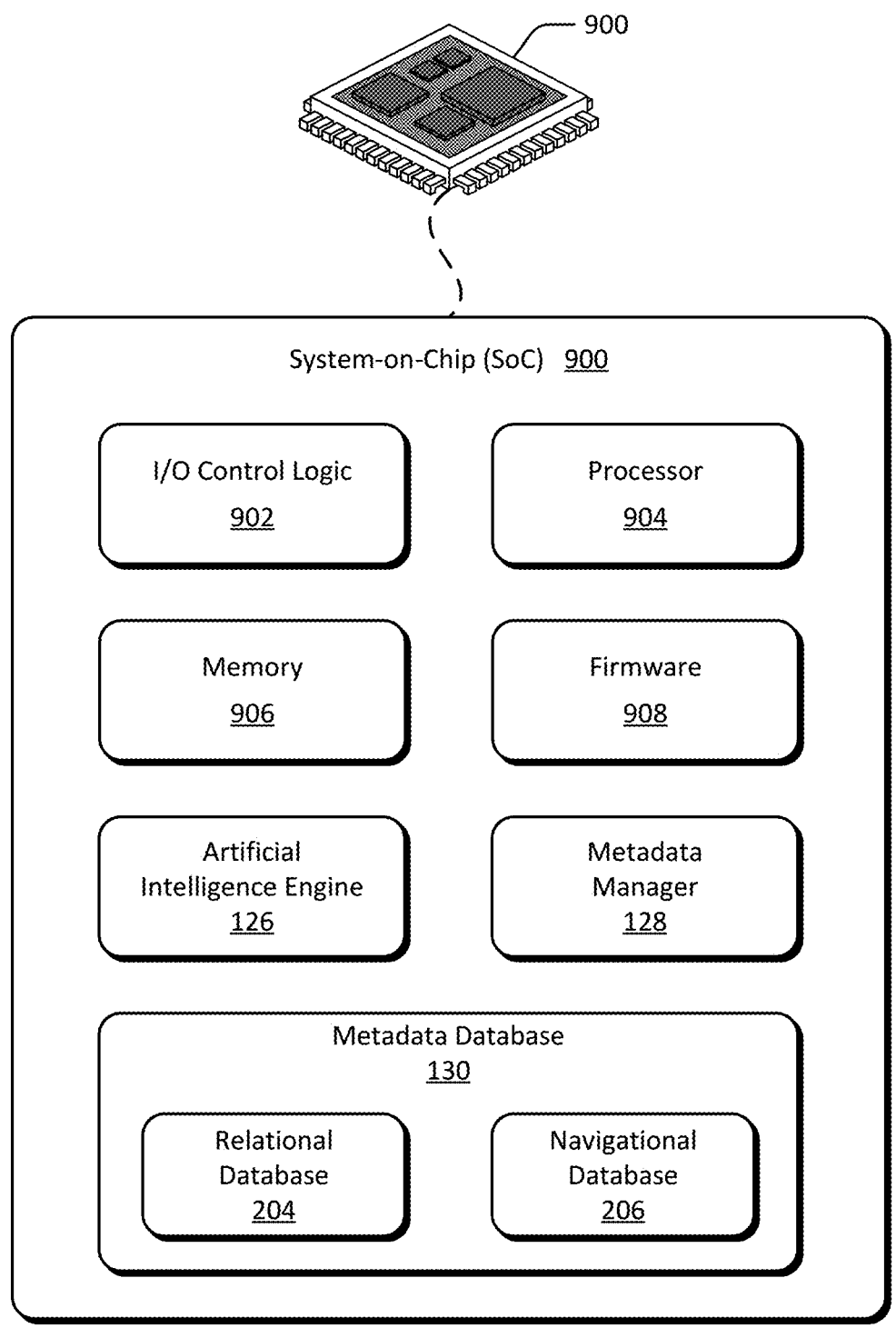
FIG. 9 illustrates an example System-on-Chip (SoC) environment for implementing aspects of AI-enabled search for a storage system.

At 806, the metadata manager determines, based on the entry in the relational database, a reference address of a target node in a navigational database that corresponds to the label. At 808, the metadata manager returns, as results for the query to search, the object of the target node at the reference address and corresponding objects of relative nodes connected to the target node in order of respective link weight System-On-Chip FIG. 9 illustrates an exemplary System-on-Chip (SoC) 900 that may implement various aspects of AI-enabled search for a storage system. The SoC 900 may be implemented in any suitable device, such as a smart-phone, netbook, tablet computer, access point, network-attached storage, camera, smart appliance, printer, set-top box, server, data center, solid-state drive (SSD), hard disk drive (HDD), storage drive array, memory module, automotive computing system, or any other suitable type of device (e.g., others described herein). Although described with reference to a SoC, the entities of FIG. 9 may also be implemented as other types of integrated circuits or embedded systems, such as an application-specific integrated-circuit (ASIC), memory controller, storage controller, communication controller, application-specific standard product (ASSP), digital signal processor (DSP), programmable SoC (PSoC), system-in-package (SiP), or field-programmable gate array (FPGA).

The SoC 900 may be integrated with electronic circuitry, a microprocessor, memory, input-output (I/O) control logic, communication interfaces, firmware, and/or software useful to provide functionalities of a computing device or storage system, such as any of the devices or components described herein (e.g., storage drive or storage array). The SoC 900 may also include an integrated data bus or interconnect fabric (not shown) that couples the various components of the SoC for data communication or routing between the components. The integrated data bus, interconnect fabric, or other components of the SoC 900 may be exposed or accessed through an external port, parallel data interface, serial data interface, peripheral component interface, or any other suitable data interface. For example, the components of the SoC 900 may access or control external storage media, AI engines, or AI networks through an external interface or off-chip data interface.

In this example, the SoC 900 includes various components such as input-output (I/O) control logic 902 and a hardware-based processor 904 (processor 904), such as a microprocessor, processor core, application processor, DSP, or the like. The SoC 900 also includes memory 906, which may include any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 904 and code stored on the memory 906 are implemented as a storage system controller or storage aggregator to provide various functionalities associated with AI-enabled search for a storage system. In the context of this disclosure, the memory 906 stores data, code, instructions, or other information via non-transitory signals, and does not include carrier waves or transitory signals. Alternately or additionally, SoC 900 may comprise a data interface (not shown) for accessing additional or expandable off-chip storage media, such as magnetic memory or solid-state memory (e.g., Flash or NAND memory).

The SoC 900 may also include firmware 908, applications, programs, software, and/or operating system, which may be embodied as processor-executable instructions maintained on the memory 906 for execution by the processor 904 to implement functionalities of the SoC 900. The SoC 900 may also include other communication interfaces, such as a transceiver interface for controlling or communicating with components of a local on-chip (not shown) or off-chip communication transceiver. Alternately or additionally, the transceiver interface may also include or implement a signal interface to communicate radio frequency (RF), intermediate frequency (IF), or baseband frequency signals off-chip to facilitate wired or wireless communication through transceivers, physical layer transceivers (PHYs), or media access controllers (MACs) coupled to the SoC 900. For example, the SoC 900 may include a transceiver interface configured to enable storage over a wired or wireless network, such as to provide a network attached storage (NAS) volume with AI-enabled search features.

The SoC 900 also includes an AI engine 126, metadata manager 128, and metadata database 130, which may be implemented separately as shown or combined with a storage component or data interface. In accordance with various aspects of AI-enabled search for a storage system, the metadata database 130 may include one or more relational databases 204 and navigational databases 206, which may be utilized to enable implicit or contextual search of storage media managed by the SoC 900. Alternately or additionally, the metadata database 130 may be stored on the memory 906 of the SoC 900 or on a memory operably coupled with the SoC 900 and accessible to the metadata manager 128. Any of these entities may be embodied as disparate or combined components, as described with reference to various aspects presented herein. Examples of these components and/or entities, or corresponding functionality, are described with reference to the respective components or entities of the environment 100 of FIG. 1 or respective configurations illustrated in FIG. 2, FIG. 3, and/or FIG. 4. The metadata manager 128, either in whole or part, can be implemented as processor-executable instructions maintained by the memory 906 and executed by the processor 904 to implement various aspects and/or features of AI-enabled search for a storage system.

The metadata manager 128, may be implemented independently or in combination with any suitable component or circuitry to implement aspects described herein. For example, AI engine 126 and/or metadata manager may be implemented as part of a DSP, processor/storage bridge, I/O bridge, graphics processing unit, memory controller, storage controller, arithmetic logic unit (ALU), or the like. The metadata manager 128 may also be provided integral with other entities of SoC 900, such as integrated with the processor 904, memory 906, a storage media interface, or firmware 908 of the SoC 900. Alternately or additionally, the AI engine 126, metadata manager 128, and/or other components of the SoC 900 may be implemented as hardware, firmware, fixed logic circuitry, or any combination thereof.

Figure 10:
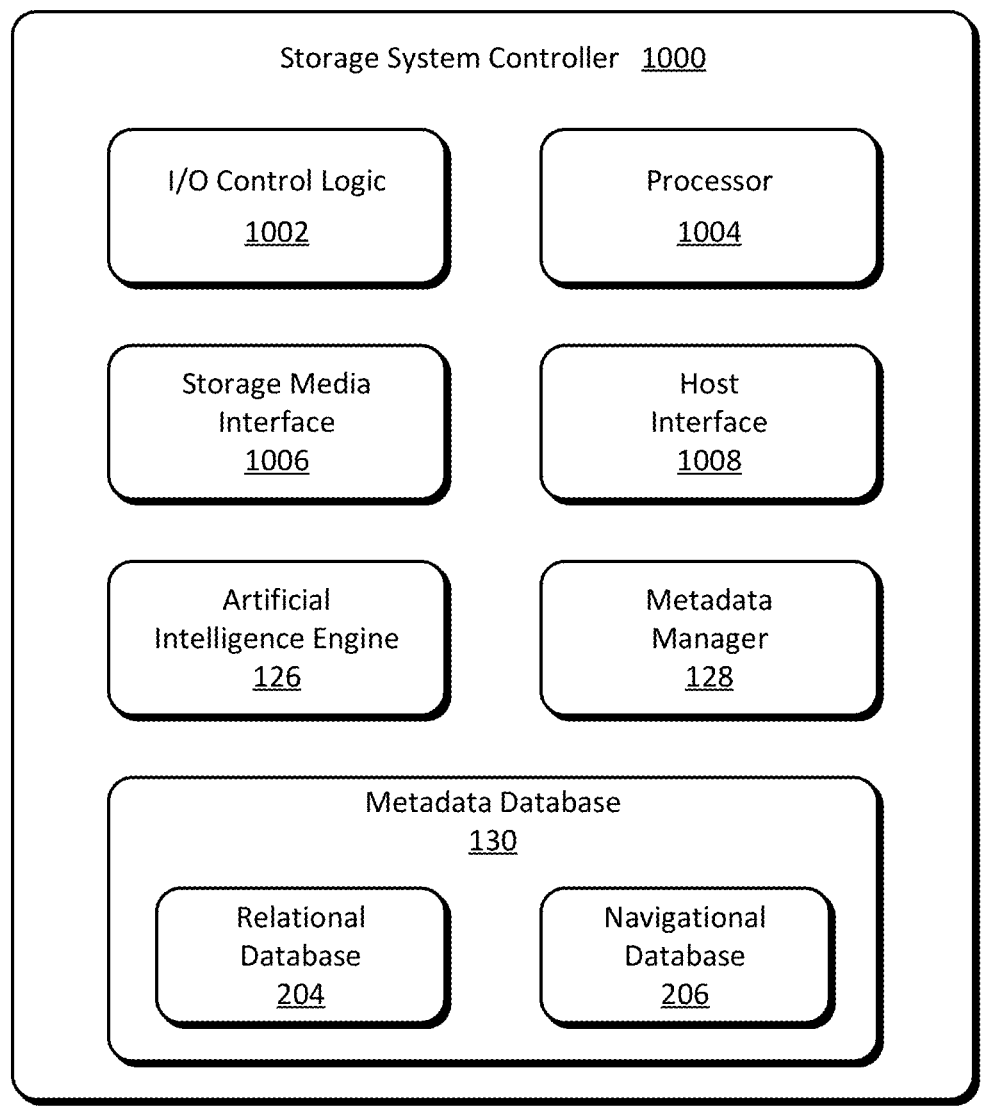
FIG. 10 illustrates an example storage system controller that is configured to implement aspects of AI-enabled search in a storage system with which the controller is associated.

As another example, consider FIG. 10 which illustrates an example storage system controller 1000 in accordance with one or more aspects of AI-enabled search for a storage system. In various aspects, the storage system controller 1000 or any combination of components thereof may be implemented as a storage drive controller, storage media controller, NAS controller, or a storage aggregation controller for solid-state storage media, magnetic storage media, or the like. In some cases, the storage system controller 1000 is implemented similar to or with components of the SoC 900 as described with reference to FIG. 9. In other words, an instance of the SoC 900 may be configured as a storage system controller, such as the storage system controller 1000 to manage solid-state or magnetic storage media. In this example, the storage system controller 1000 includes input-output (I/O) control logic 1002 and a processor 1004, such as a microprocessor, processor core, application processor, DSP, or the like. The storage system controller also includes a storage media interface 1006 (e.g., NAND interface) and a host interface 1008 (e.g., SATA, PCIe, or Fabric interface), which enable access to storage media and host system, respectively.

In some aspects, the storage system controller 1000 implements aspects of AI-enabled search for a storage system when managing or enabling access to storage media that is coupled to storage media interface 1006. The storage system controller 1000 may provide a storage interface for a host system via the host interface 1008, through which storage access commands are received from the host system. Alternately or additionally, the metadata manager 128 may receive metadata labels or indications from an external AI engine or AI network via the host interface 1008 or another data interface of the storage system controller 1000. For example, the metadata manager 128 may receive, through the host interface 1008, AI-generated labels and respective confidence level indicators with data to be stored to storage media that is operably coupled to the storage media interface 1006 of the storage system controller. In some aspects, the processor 1004 and firmware of the storage system controller are implemented to provide various data access functionalities associated with AI-enabled search for a storage system.

The metadata manager 128 of the storage system controller 1000 may be implemented separately as shown or combined with the processor 1004, AI engine 126, or storage media interface 1006. In accordance with various aspects, the metadata manager 128 may create and manage the relational database 204 and navigational database 206 (e.g., weighted node graphs) of the metadata database 130. Examples of these components and/or entities, or corresponding functionality, are described with reference to the respective components or entities of the environment 100 of FIG. 1 or respective configurations illustrated in FIG. 2, FIG. 3, and/or FIG. 4. The metadata manager 128, either in whole or part, may be implemented as processor-executable instructions maintained by memory of the controller and executed by the processor 1004 to implement various aspects and/or features of AI-enabled search for a storage system.

Although the subject matter has been described in language specific to structural features and/or methodological operations, it is to be understood that the subject matter defined in the appended claims is not necessarily limited to the specific examples, features, or operations described herein, including orders in which they are performed.

What is claimed is:

1. A method for artificial intelligence (AI) enabled search of a storage system, comprising:
   receiving, from an artificial intelligence engine, a label for a detected object in a data file stored in storage media of the storage system and a first level of confidence indicating a probability level of AI detection for the detected object in an environment of the data file;
   creating, in a relational section of a metadata database of the storage system, an entry for the detected object, the entry including an identifier of the label for the detected object, an address for the data file of detected object in the storage system, an offset indicative of a temporal location of the detected object in the data file, and an address of a node in a navigational section of the metadata database that corresponds to the detected object;
   creating the node corresponding to the detected object in the navigational section of the metadata database of the storage system, the node identifiable by the address of the entry in the relational section of the metadata database for the detected object;
   receiving, from the artificial intelligence engine, a second level of confidence in a contextual relationship between the detected object and another object in the data file stored in the storage system to which the detected object is related, the contextual relationship relating to a common presence of the object and the other object in a same frame of the data file or temporal proximity of the object and the other object across different frames of the data file stored in the storage system;
   defining, based on the second level of confidence received from the artificial intelligence engine, a weight value that indicates the second level of confidence in the contextual relationship between the detected object and the other object to which the detected object is related; and
   connecting, in the navigational section of the metadata database, the node corresponding to the detected object to a relative node corresponding to the other object in the data file stored in the storage media of the storage system with a weighted link having the weight value that indicates the second level of confidence in the contextual relationship between the object and the other object.

2. The method of claim 1, further comprising exposing the metadata database of the storage system to a search interface to enable search of the metadata database for at least the detected object or the other object based on the weight value of the weighted link that indicates the second level of confidence in the contextual relationship between the object and the other object.

3. The method of claim 2, wherein enabling search of the metadata database for at least the detected object or the other object based on the weight value of the weighted link that indicates the second level of confidence in the contextual relationship between the object and the other object enables contextual or implicit search of the data files stored by the storage system.

4. The method of claim 1, further comprising:
   receiving, at the artificial intelligence engine, data to be stored in the storage system that includes at least the data file;
   processing, with the artificial intelligence engine, the data to be stored to detect multiple objects in the data, the multiple objects including the detected object and the other object; and providing a set of respective labels and levels of confidence for the multiple detected objects in the data, the set of respective labels and levels of confidence including the label and the first level of confidence for the detected object and a label and a third level of confidence for the other object, the third level of confidence indicating a probability level of AI detection for the other object in the environment of the data file.

5. The method of claim 1, wherein the second level of confidence is provided based on a first artificial intelligence model executed by the artificial intelligence engine and the method further comprises:
receiving, from the artificial intelligence engine and based on a second artificial intelligence model executed by the artificial intelligence engine, a third level of confidence in the contextual relationship between the detected object in the data file and the other object in the data file; and
redefining the weight value of the weighted link connecting the node to the relative node based on the third level of confidence in the contextual relationship between the detected object in the data file and the other object in the data file; or
unlinking the node from the relative node based on the third level of confidence in the contextual relationship between the detected object in the data file and the other object in the data file stored in the storage system.

6. The method of claim 1, wherein:
the storage system comprises at least one of a solid-state drive (SSD), a hard disk drive (HDD), or an aggregate array of storage media drives; and
the method is implemented by a storage controller of the SSD, a storage controller of the HDD, or a controller that provides a host interface for the aggregate array of storage media drives.

7. The method of claim 1, further comprising:
receiving a search query from a user;
obtaining, based on the search query, labels from the relational section of the metadata database, the labels including at least the label of the detected object;
locating, based on the identifier of the detected object, the node that corresponds to the detected object in the navigational section of the metadata database;
identifying other nodes connected to the node in the navigational section of the metadata database by respective weighted links that have weight values indicative of respective second levels of confidence in contextual relationships between the object and other objects in the storage media to which the other nodes correspond; and
returning, as results to the search query and from the data stored in the storage media, the detected object and other objects with respective indications of the second levels of confidence in the contextual relationships between the object and other objects.

8. The method of claim 1, wherein:
the data file is a media data file that includes at least one of audio data or video data in which the detected object is detected; and
the offset indicative of the temporal location of the detected object in the data file indicates a frame of media data file in which the detected objected is located or a time reference in the media data file at which the detected object is located.

9. A data storage apparatus comprising:
an interface to receive data from a host;
storage media configured to store the data received from the host;
a controller configured to enable access to the data stored on the storage media; and
an artificial intelligence-enabled (AI-enabled) metadata manager configured to:
receive, from an artificial intelligence engine associated with the data storage apparatus, a label for an object detected by the artificial intelligence engine in a data file stored in the storage media of the data storage apparatus and a first level of confidence indicating a probability level of AI detection for the detected object in an environment of the data file;
create, in a relational section of a metadata database for the data stored in the data storage apparatus, an entry for the detected object, the entry including an identifier of the label for the detected object, an address of the detected object in the data file stored to the storage media, an offset indicative of a temporal location of the detected object in the data file, and an address of a node in a navigational database of the metadata database that corresponds to the detected object;
create the node corresponding to the detected object in the navigational database of the metadata database, the node identifiable by the address of the entry in the relational section of the metadata database for the detected object;
receive, from the artificial intelligence engine, a second level of confidence in a contextual relationship between the detected object and another object in the data file stored to the storage media to which the detected object is related, the contextual relationship relating to a common presence of the object and the other object in a same frame of the data file;
define, based on the second level of confidence received from the artificial intelligence engine, a weight value that indicates the level of confidence in the contextual relationship between the detected object and the other object to which the detected object is related; and
connect, in the navigational section of the metadata database, the node corresponding to the detected object to a relative node corresponding to the other object in the data file stored to the storage media with a weighted link having the weight value that indicates the second level of confidence in the contextual relationship between the object and the other object.

10. The data storage apparatus of claim 9, further comprising a search agent associated with the AI-enabled metadata manager, the search agent configured to expose the metadata database to enable search of the metadata database for at least the detected object or the other object based on the weight value of the weighted link that indicates the second level of confidence in the relationship between the object and the other object.

11. The data storage apparatus of claim 9, further comprising the artificial intelligence engine and the artificial intelligence engine is configured to provide at least one of:
the label for the object detected in the data stored in the storage media of the data storage apparatus;
the first level of confidence indicating the probability level of AI detection for the detected object in the environment of the data file; or the second level of confidence in the contextual relationship between the object and the other object detected in the data file stored in the storage media of the data storage apparatus.

12. The data storage apparatus of claim 9, wherein:
the data storage apparatus comprises a solid-state drive (SSD), a hard disk drive (HDD), or an aggregate array of storage media drives; and
the controller of the data storage apparatus is implemented as a storage controller of the SSD, a storage controller of the HDD, or a storage controller for the aggregate array of storage media drives.

13. The data storage apparatus of claim 10, wherein the search agent is further configured to:
receive a search query from a user;
obtain, based on the search query, labels from the relational section of the metadata database, the labels including at least the label of the detected object;
locate, based on the identifier of the detected object, the node that corresponds to the detected object in the navigational section of the metadata database;
identify other nodes connected to the node in the navigational section of the metadata database by respective weighted links that have weight values indicative of respective second levels of confidence in contextual relationships between the object and other objects in the storage media to which the other nodes correspond; and
return, as results to the search query and from the data stored to the storage media, the detected object and other objects with respective indications of the second levels of confidence in the contextual relationships between the object and other objects.

14. The data storage apparatus of claim 9, wherein the data storage apparatus further comprises:
a first artificial intelligence model for the artificial intelligence engine to that is configured to provide the second level of confidence in the contextual relationship between the detected object and the other object;
a second artificial intelligence model for the artificial intelligence engine that is configured to provide a third level of confidence in the contextual relationship between the detected object and the other object; and
the AI-enabled metadata manager is further implemented to:
redefine the weight value of the weighted link connecting the node to the relative node based on the third level of confidence in the contextual relationship between the detected object and the other object in the data; or
unlink the node from the relative node based on the third level of confidence in the contextual relationship between the detected object and the other object in the data.

15. A System-on-Chip (SoC) for managing data storage, the SoC comprising:
an interface to storage media of a storage system;
an interface to a host from which data is received for writing to the storage media;
a hardware-based processor;
a memory storing processor-executable instructions that, responsive to execution by the hardware-based processor, implement an artificial intelligence-enabled (AI-enabled) metadata manager to:
receive, from an artificial intelligence engine, a label for a detected object detected by the artificial intelligence engine in a data file stored to the storage media and a first level of confidence indicating a probability level of AI detection for the detected object in an environment of the data file;
create, in a relational section of a metadata database, an entry for the detected object, the entry including an identifier of the label of the detected object, an address of the detected object in the data stored to the storage media, an offset indicative of a temporal location of the detected object in the data file, and an address of a node in a navigational database of the metadata database that corresponds to the detected object;
create the node corresponding to the detected object in the navigational database of the metadata database, the node identifiable by the address of the entry in the relational section of the metadata database for the detected object;
receive, from the artificial intelligence engine, a second level of confidence in a contextual relationship between the detected object and another object detected in the data file stored to the storage media to which the detected object is related, the contextual relationship relating to a temporal proximity of the object and the other object across different frames of the data file stored to the storage media;
define, based on the second level of confidence received from the artificial intelligence engine, a weight value that indicates the second level of confidence in the contextual relationship between the detected object and the other object to which the detected object is related; and
connect, in the navigational section of the metadata database, the node corresponding to the detected object to a relative node corresponding to the other object in the data file stored to the storage media with a weighted link having the weight value that indicates the second level of confidence in the contextual relationship between the object and the other object.

16. The SoC for managing data storage of claim 15, further comprising a search agent associated with the AI-enabled metadata manager, the search agent configured to expose the metadata database to enable search of the metadata database for at least the detected object or the other based on the weight value of the weighted link that indicates the second level of confidence in the relationship between the object and the other object.

17. The SoC for managing data storage of claim 15, wherein the artificial intelligence engine is embodied at least in part as hardware of the SoC, executable code that is stored on the memory of the SoC, or executable code stored to another memory that is accessible by the hardware-based processor of the SoC.

18. The SoC for managing data storage of claim 16, wherein the search agent is further configured to:
receive a search query from a user;
obtain, based on the search query, labels from the relational section of the metadata database, the labels including at least the label of the detected object;
locate, based on the label and identifier of the detected object, the node that corresponds to the detected object in the navigational section of the metadata database;
identify other nodes connected to the node in the navigational section of the metadata database by respective weighted links that have weight values indicative of second levels of confidence in contextual relationships between the object and other objects in the data stored to the storage media to which the other nodes correspond; and return, as results to the search query and from the data stored to the storage media, the detected object and other objects with respective indications of the second level of confidence in the contextual relationships between the object and other objects.

19. The SoC for managing data storage of claim 15, further comprising the artificial intelligence engine, the artificial intelligence engine configured to provide:

respective labels for objects detected by the artificial intelligence engine in the data files stored to the storage media, the respective labels including at least the label for the detected object;

respective first levels of confidence indicating probability levels of AI detection for the detected objects in environments of the data files stored to the storage media, the respective first levels of confidence including the first level of confidence for the detected object; and respective second levels of confidence in contextual relationship between objects detected by the artificial intelligence engine in the data stored to the storage media, the respective second levels of confidence including at least the second level of confidence in the contextual relationship between the detected object and the other object.

20. The SoC for managing data storage of claim 19, wherein the SoC further comprises:

a first artificial intelligence model for the artificial intelligence engine to that is configured to provide the second level of confidence in the contextual relationship between the detected object and the other object;

a second artificial intelligence model for the artificial intelligence engine that is configured to provide a third level of confidence in the contextual relationship between the detected object and the other object; and the AI-enabled metadata manager is further implemented to:

redefine the weight value of the weighted link connecting the node to the relative node based on the third level of confidence in the contextual relationship between the detected object and the other object in the data; or unlink the node from the relative node based on the third level of confidence in the contextual relationship between the detected object and the other object in the data.

* * * * *